United States Patent
Singh et al.

(10) Patent No.: US 12,063,156 B2
(45) Date of Patent: Aug. 13, 2024

(54) FINE-GRANULARITY ADMISSION AND FLOW CONTROL FOR RACK-LEVEL NETWORK CONNECTIVITY

(71) Applicant: Enfabrica Corporation, Mountain View, CA (US)

(72) Inventors: Gurjeet Singh, Mountain View, CA (US); Ari Aravinthan, Mountain View, CA (US); Shimon Muller, Mountain View, CA (US); Jay Peterson, Mountain View, CA (US); Shrijeet Mukherjee, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

(21) Appl. No.: 18/096,371

(22) Filed: Jan. 12, 2023

(65) Prior Publication Data

US 2024/0243996 A1  Jul. 18, 2024

(51) Int. Cl.
*H04L 45/00* (2022.01)
*H04L 47/122* (2022.01)

(52) U.S. Cl.
CPC .......... *H04L 45/38* (2013.01); *H04L 45/566* (2013.01); *H04L 47/122* (2013.01)

(58) Field of Classification Search
CPC ...... H04L 45/38; H04L 45/566; H04L 47/122
See application file for complete search history.

(56) References Cited

U.S. PATENT DOCUMENTS

| | | | |
|---|---|---|---|
| 7,778,254 B2* | 8/2010 | Kadambi | H04L 47/43 370/395.71 |
| 11,290,395 B1* | 3/2022 | Goldman | H04L 49/206 |
| 2006/0092845 A1 | 5/2006 | Kwan et al. | |
| 2007/0047535 A1* | 3/2007 | Varma | H04L 47/30 370/360 |

(Continued)

FOREIGN PATENT DOCUMENTS

EP    2695338 B    2/2014

OTHER PUBLICATIONS

International Search Report and Written Opinion for International Patent Application No. PCT/US2024/011075, dated May 15, 2024 (76 pages).

*Primary Examiner* — Moustafa M Meky
*Assistant Examiner* — Kidest Mendaye
(74) *Attorney, Agent, or Firm* — Goodwin Procter LLP

(57) ABSTRACT

A system for admission and flow control is disclosed. In some embodiments, the system includes a switch for routing network traffic, having multiple classes of service (CoSs), from multiple ingress ports to one or more of multiple egress ports. The system also includes multiple ingress-level class of service queues (InCoS-Qs) and one or more egress-level class of service queues (EgCoS-Qs), each InCoS-Q and EgCoS-Q corresponding to one of CoSs. The switch is configured to detect congestion in a particular EgCoS-Q, corresponding to a particular CoS, the particular EgCoS-Q being associated with a particular host; identify an InCoS-Q corresponding to that particular CoS, and associated with that particular host; and block that InCoS-Q, while allowing (Continued)

routing of the network traffic from one or more InCoS-Qs corresponding to that particular CoS, the one or more InCoS-Qs corresponding to one or more other hosts.

18 Claims, 5 Drawing Sheets

(56) References Cited

U.S. PATENT DOCUMENTS

| | | | | |
|---|---|---|---|---|
| 2007/0153697 | A1* | 7/2007 | Kwan | H04L 47/627 370/468 |
| 2007/0201499 | A1* | 8/2007 | Kapoor | H04L 47/2408 370/412 |
| 2009/0300209 | A1* | 12/2009 | Elzur | H04L 47/10 709/242 |
| 2010/0054127 | A1* | 3/2010 | Kwan | H04L 49/90 370/235 |
| 2012/0275301 | A1* | 11/2012 | Xiong | H04L 47/6295 370/230 |
| 2013/0329577 | A1 | 12/2013 | Suzuki et al. | |
| 2014/0022901 | A1* | 1/2014 | Suzuki | H04L 47/266 370/235 |
| 2017/0048144 | A1* | 2/2017 | Liu | H04L 47/122 |
| 2021/0075746 | A1* | 3/2021 | Frankel | H04L 47/32 |
| 2022/0078119 | A1* | 3/2022 | Goyal | H04L 47/25 |
| 2023/0079715 | A1* | 3/2023 | Seely | H04L 47/12 370/235 |

* cited by examiner

FINE-GRANULARITY ADMISSION AND FLOW CONTROL FOR RACK-LEVEL NETWORK CONNECTIVITY

TECHNICAL FIELD

This disclosure relates to a communication system that allows admission and flow control over offending host interfaces and/or offending queues within a host's host interfaces.

BACKGROUND

Admission and flow control is one of the most important data processing procedures in communication systems. It coordinates the amount of data that can be sent before a receiving limit is reached, based at least on designing and configuration of switches and Network Interface Controller (NICs). While admission and flow control has been a focus of research and industry for years, there are still some limitations. For example, in parallel computing, the applications that run in parallel often share a NIC when connecting to a network, which may cause an application to be temporally restricted in resource use when another application uses more resources than were originally allocated. This noisy neighbor problem, i.e., the behavior of an application affecting the performance of another application sharing the same NIC, becomes even worse in a virtualization environment where the use of resources are mostly controlled on the application side. When a switch gets congested because of a misbehaving application on a sending server, the congestion status on the switch may further propagate. That is, the congestion may be extended not only to multiple applications running on the same server but also to multiple applications running on different servers that temporally share the same egress or exiting port on the switch, resulting in overall performance degradation.

SUMMARY

To address the aforementioned shortcomings, a granularity-level admission and flow control system is provided. In some embodiments, the system includes a switch for routing network traffic, having a plurality of classes of service, from each of a plurality of ingress ports to one or more of a plurality of egress ports. The system also includes a plurality of interfaces (NICs), each interface corresponding to a respective ingress port and comprising one or more class of service queues (CoS-Qs) respectively corresponding to one or more of the plurality of classes of service. In some embodiments, the switch is configured to detect congestion in a particular CoS-Q, corresponding to a particular class of service, the particular CoS-Q belonging to a particular interface associated with a particular ingress port; and block that particular interface, while allowing routing of the network traffic from one or more CoS-Qs corresponding to that particular class of service, the one or more CoS-Qs belonging to one or more other interfaces associated with one or more other ingress ports.

In other embodiments, the system includes a switch for routing network traffic, having a plurality of classes of service, from each of a plurality of ingress ports to one or more of a plurality of egress ports. The system includes a plurality of ingress-level class of service queues (InCoS-Qs), each InCoS-Q corresponding to one of the plurality classes of service. The system also includes one or more egress-level class of service queues (EgCoS-Qs), each EgCoS-Q corresponding to one of the plurality classes of service. In some embodiments, the switch is configured to detect congestion in a particular EgCoS-Q, corresponding to a particular class of service, the particular EgCoS-Q being associated with a particular host; identify an InCoS-Q corresponding to that particular class of service, and associated with that particular host; and block that InCoS-Q, while allowing routing of the network traffic from one or more InCoS-Qs corresponding to that particular class of service, the one or more InCoS-Qs corresponding to one or more other hosts.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles, and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
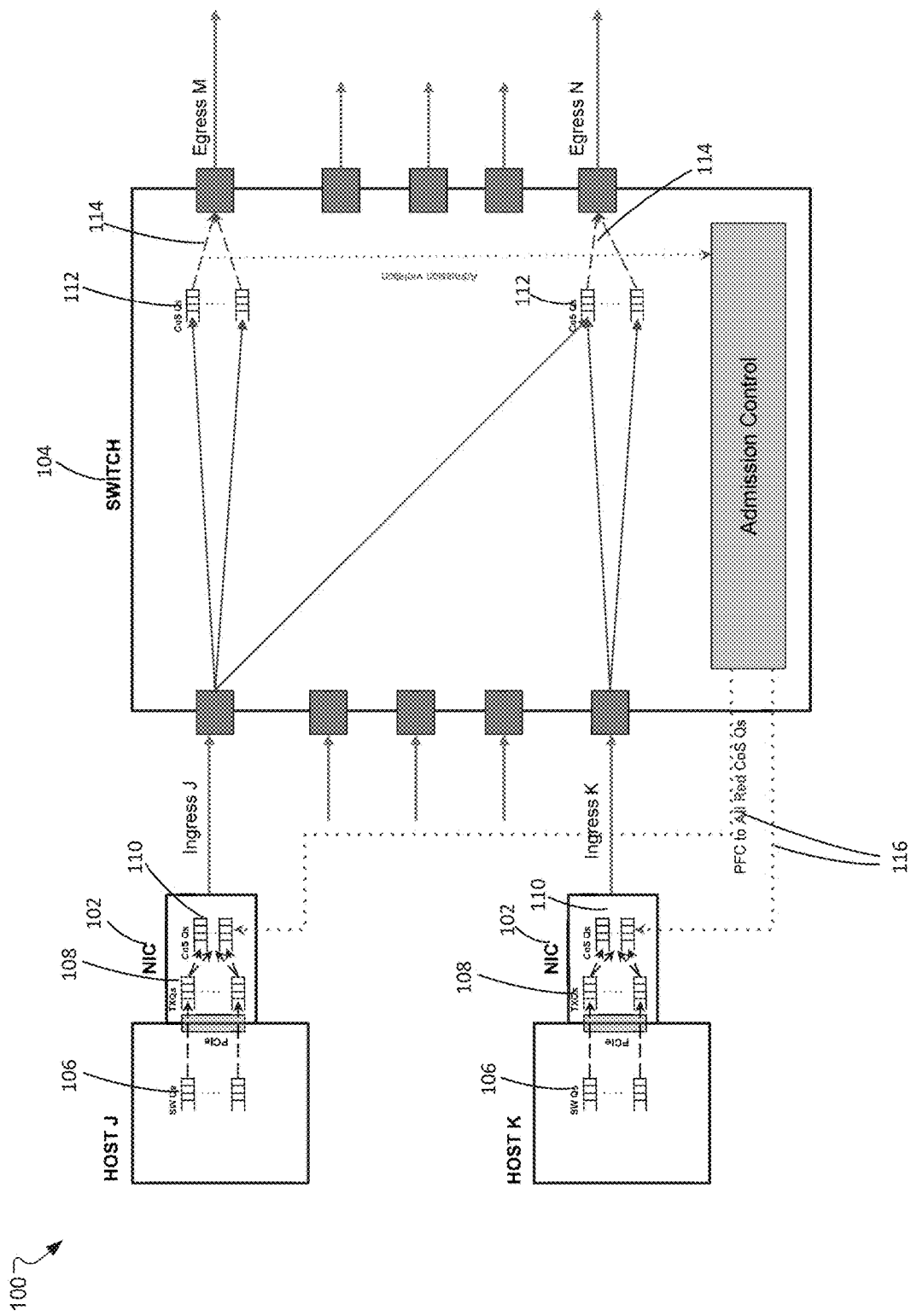
FIG. 1 illustrates an exemplary prior art architecture for switch-based network connection, according to some embodiments.

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A current computing environment typically includes clusters of compute and storage elements (e.g., compute nodes, memory devices), rather than a single stand-alone compute system. These compute clusters may be very different, for example, from a few compute and storage elements in a small business environment, to a large number of nodes in a large cloud service provider data center. Nevertheless, the operations of all compute clusters are based on connections and communications of the compute and storage elements through networking devices. The networking devices, such as NICs, switches, and routers, include networking hardware, software, and associated protocols to create and connect networks. The networking devices allow a collection of distinct compute and storage elements to act as a homogeneous cluster to execute one or more applications that deliver various desired services.

A compute node (e.g., a server) uses one or more NICs to connect to a network. For example, two NICs may be used in a dual-homed server when redundancy and resiliency are critical. In some embodiments, a NIC may be plugged into a compute node via a Peripheral Component Interconnect Express (PCIe) expansion bus and connect the compute node to a network switch. Network switches may provide one-to-many and many-to-one fanout when connecting various compute nodes, for example, in a way of sending messages from a single compute node to multiple receiving compute nodes or vice versa. This creates various hierarchical network topologies. One of the most prevalent networks interconnect topologies is Ethernet. The disclosure hereafter is mainly described in the context of Ethernet.

To satisfy the exploded demand for processing large amounts and types of data, the uniprocessor designs have been changed to multi-core processors, and compute nodes (e.g., servers) deployed in datacenters are using at least one Central Processing Unit (CPU) that contain dozens or hundreds of processing cores or threads. With such developments in multi-core processors, parallel computing starts playing a pivotal role in the data processing. Parallel computing allows various applications, each having its individual network bandwidth and latency requirement, to run in parallel. Oftentimes, these applications share a NIC to connect to a network. When one application uses more resources (e.g., a buffer queue) than were originally allocated, at least one other application that shares the NIC with the one application may get fewer resources and underperform accordingly. In other words, an existent problem is that an application's behavior can affect another application's performance if the two applications share the same NIC, i.e., the noisy neighbor effect. This problem becomes more troublesome in systems that are logically partitioned using various virtualization technologies, such as containers and/or Virtual Machines (VMs). In such systems, a logical partition may be "rented out" to users or customers that run applications, which leaves the customers rather than system administrators to impose controls on the operations of applications. The user/customer control, however, cannot guarantee a certain level of shared resource provisioning to each application.

When an Ethernet NIC on a compute node (e.g., a server) is connected to a first-level switch in a network topology at the Top Of the Rack (TOR), the information of threads and applications is unknown to the switch. A typical Ethernet switch is only aware of NICs or servers it aggregates as well as the network protocol flows generated from the NICs or servers. The loss of awareness of threads and applications is another major problem in existing technologies. For example, when the switch experiences a congestion event due to a many-to-one network traffic scenario, a misbehaving application may affect not only the performance of the applications running on the same server, but also the performance of applications that run on different servers. These different servers temporarily share the same egress port of the switch with the offending server, i.e., the server running the misbehaving application. Absent the management of the applications and thread, the switch can only throttle the entire offending server to control the congestion. This penalizes all the applications that run on the offending server rather than the one application on that server that has caused the congestion.

Currently, there are solutions to alleviate some of the problems described above. For example, the Ethernet protocol provides a Priority Flow Control (PFC) mechanism. Based on the PFC mechanism, network flows can be grouped into priority classes, and the flow of each class can be individually controlled on an Ethernet point-to-point link. According to IEEE 802.1Q, a link-level flow can be categorized into eight Classes of Service (CoSs). As recommended in IEEE 802.1p, the eight CoS may represent, from the lowest priority to highest priority, traffic types of background, best effort, excellent effort, critical applications, video, voice, internetwork control, and network control. While the eight priority levels of CoSs enable some level of differentiation and resource isolation between applications, these priority classes do not support the granularity level and scale level required by modern computing system deployments (e.g., hundreds of CPU cores/threads, running thousands of application network flows). The PFC mechanism may cause some additional problems. A single NIC may be the source of traffic that triggers a PFC generation event for a given class. But a PFC notification will penalize all NICs for the given class. This may create an uneven bandwidth utilization problem across different ports. The present disclosure provides an integrated control device of NICs and switches that is optimized to address the aforementioned problems.

FIG. 1 illustrates an example prior art architecture 100 for switch-based network connection. The example architecture 100 provides a conceptual depiction of the functional partitioning between NICs and switches in existing technologies for server connectivity to Ethernet networks.

Various software applications (not shown), each having its individual network bandwidth and latency requirement, run on host J and host K (e.g., servers) in a form of compute cores/threads and generate the flows of application data. The application data flows are to be transmitted from host J and host K to one or more destinations through the network connections established using NICs 102 and a switch 104. It should be noted that each of the reference numbers 102 and 106, 108, 110, and 112 (described below) is a collective label, where 102 can be referred to both NICs that connect host J and host K to the network, and 106, 108, 110, and 112 can be referred to various queues associated with application data flows from each of host J and host K.

As depicted in FIG. 1, on the server side, the application data flows that run on a number of compute cores/threads are mapped to software queues 106 in the main memory of host J and host K. NICs 102 provide a multitude (e.g., hundreds, thousands) of hardware queues or transmit queues 108, which serve as extensions to software queues 106 to send out data packets of the application data flows. The packets in hardware/transmit queues 108 are transmitted without requiring a software interrupt to the host's CPU to ensure the full use of interface bandwidth. In this way, parallel processing of network data streams (e.g., application data flows) can be handled with minimal contention (e.g., competition for resources) from the application itself through the head of the hardware queues 108 on the NICs 102.

At the egress of transmit queues (TXQs) 108, the application data flows are grouped into eight CoS queues 110 and are sent out on the network. In the illustrated embodiment, each data packet of the application data flows is sent to an ingress port (e.g., ingress J or ingress K) of switch 104, where switch 104 forwards the packet to an egress port (e.g., egress M or egress N) leading towards the packet's destination. When congestion is detected at the far end of the data link, a remote device (e.g., a switch) can flow control the offending CoS group. The offending CoS group includes the data traffic of a specific CoS that has caused the congestion. The flow control over the offending CoS group includes stopping all the data traffic from the TXQs 108 that belong to the specific CoS, while continuing to allow the data that belongs to different CoSs to go through to the switch.

On the switch side, switch 104 forwards data packets received in an ingress port to an egress port that furthers the packets to corresponding destinations. To support lossless transmission, it is imperative that the underlying switching/routing architecture and implementation provide both bandwidth fairness and congestion isolation for all devices connected to the ports of switch 104. This is usually implemented using ingress admission control policies that limit the number of shared resources (e.g., link bandwidth, packet buffering, etc.) dedicated to an ingress port, a CoS queue, etc. Based on the admission policies, switch 104 may first check the resource requirement of a network flow before transmitting it further through ingress ports. If there is a chance of congestion or congestion in the network, switch 104 may deny establishing a virtual network connection to prevent further congestion. The existing admission control mechanism, however, is typically agnostic of congestion at destination/ingress ports. Therefore, when one or more egress ports become congested and/or violate policies (e.g., a global CoS policy), the flow control (e.g., PFC) will be issued to all the hosts or sending nodes. That is, this flow control will cause all TXQs 108 that belong to the CoS group that violated the admission policy to take corrective action (e.g., blocking subsequent data intake). For example, even if the congestion is caused by a particular data flow (e.g., host J) of a particular class, all of the data flows of that particular class, i.e., all TXQs 108 from host J, host K of the particular class, will be stopped or delayed.

As shown in FIG. 1, the congestion is detected in 114 (e.g., the far end of switch 104) relating to a class of data flow. Without an indication of data oversubscription on the server/host side, the PFC is performed over all hosts, that is, the data flow of that class from both host J and host K are blocked as in 116. The flow control in FIG. 1, therefore, has no per-flow discrimination or any other granularity-level flow control (e.g., per VMs, per container, etc.). In other words, the existing admission and flow control disallow the enforcement of any policies that require finer granularity. The existing control therefore may not satisfy the data transmission requirement (e.g., latency requirement, or packet loss requirement) and further result in degraded performance or even service failure.

Integrated Control Device Overview

Figure 2:
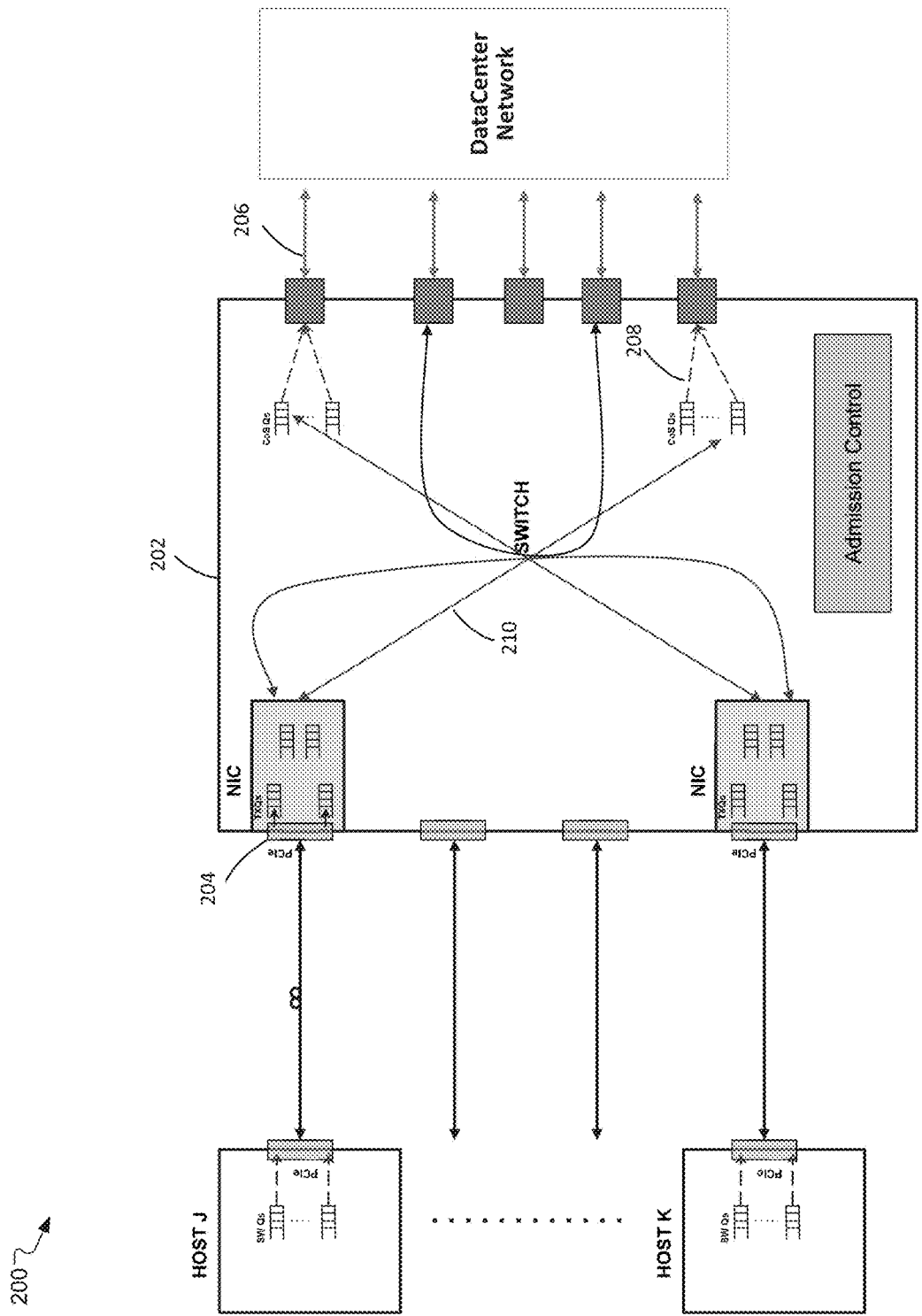
FIG. 2 illustrates an exemplary system that enables granularity-level admission and flow control, according to some embodiments.

FIG. 2 illustrates an exemplary system 200 that enables granularity-level admission and flow control. In system 200, servers (e.g., host J and host K) may communicate with a data center network via device 202. Device 202 is an integrated control device, in which a multitude of NICs is integrated with a TOR switch. On one side, device 202 provides an interface to each server via a PCIe cable and/or connector (e.g., PCIe 204), functioning similarly to the host interface of a traditional NIC. On the other side, device 202 connects to the datacenter network via standard Ethernet links 206, indicating that device 202 also functions similarly to the network interface of a traditional TOR switch. While FIG. 2 is depicted in the context of communications between hosts/servers and network, it should be noted that device 202 is capable of providing bi-directional host-to-network/network-to-host, network-to-network, and peer-to-peer server connectivity. Each of these communications may be based on standard Ethernet network semantics.

The integrated design of device 202 is advantageous in various aspects. Based on the physical co-location of the NICs and the switch (e.g., on a single silicon die), device 202 may be optimized to overcome the shortcomings of the existing art (e.g., as shown in FIG. 1). For example, multiple levels of queuing structures and associated arbitration schemes may be incorporated into packet flows, thereby achieving a desired level of granularity as well as solving the Head of Line (HoL) blocking problem. HoL blocking occurs when there is a queue of data packets waiting to be transmitted, and the packet at the head of the queue/line (e.g., going to a specific destination) cannot move forward due to congestion, even if other packets (e.g., going to different destinations) behind this packet could. The various queues and arbiters may incorporate different metering techniques that generate events based on desired admission control policies. This allows the packet flow pipeline to backpressure policy-offending flows to the source, without causing widespread congestion and without affecting other unrelated traffic flows. This is particularly impactful when the transmitted data is sourced from a host/server. Software applications running on the host may send the application data to the memory of the host, and the memory buffers the data packets before sending them out to the network. The new structure of device 202 allows the software applications to know whether the memory buffers have been filled up and then take appropriate action without consuming other shared network buffering resources. As shown in FIG. 2, once the congestion is detected in 208, only data of a particular CoS from the offending host, i.e., host J, is blocked in 210. The data transmission of any CoS in host K continues.

Implementation of Admission and Flow Control

Queue Structure and Packet Flow

As described above in FIG. 2, when there is network congestion due to a particular class of data flow, integrated device 202 can identify one or more offending hosts (e.g., host J) from which the particular class of data flow caused the congestion. As a result, integrated device 202 may block the particular class of service from the offending host (e.g., host J) without affecting any data flow transmission (including the data flow of that particular class) from other hosts (e.g., host K). As compared to identifying offending host(s) in FIG. 2, the integrated device of FIG. 3 may allow finer granularity by identifying, from the offending host(s), one or more offending host interfaces (e.g., virtual NICs) and/or offending queues within the host interfaces. The offending host interfaces and/or offending queues are sources of the particular class of data flow that caused the congestion.

Figure 3:
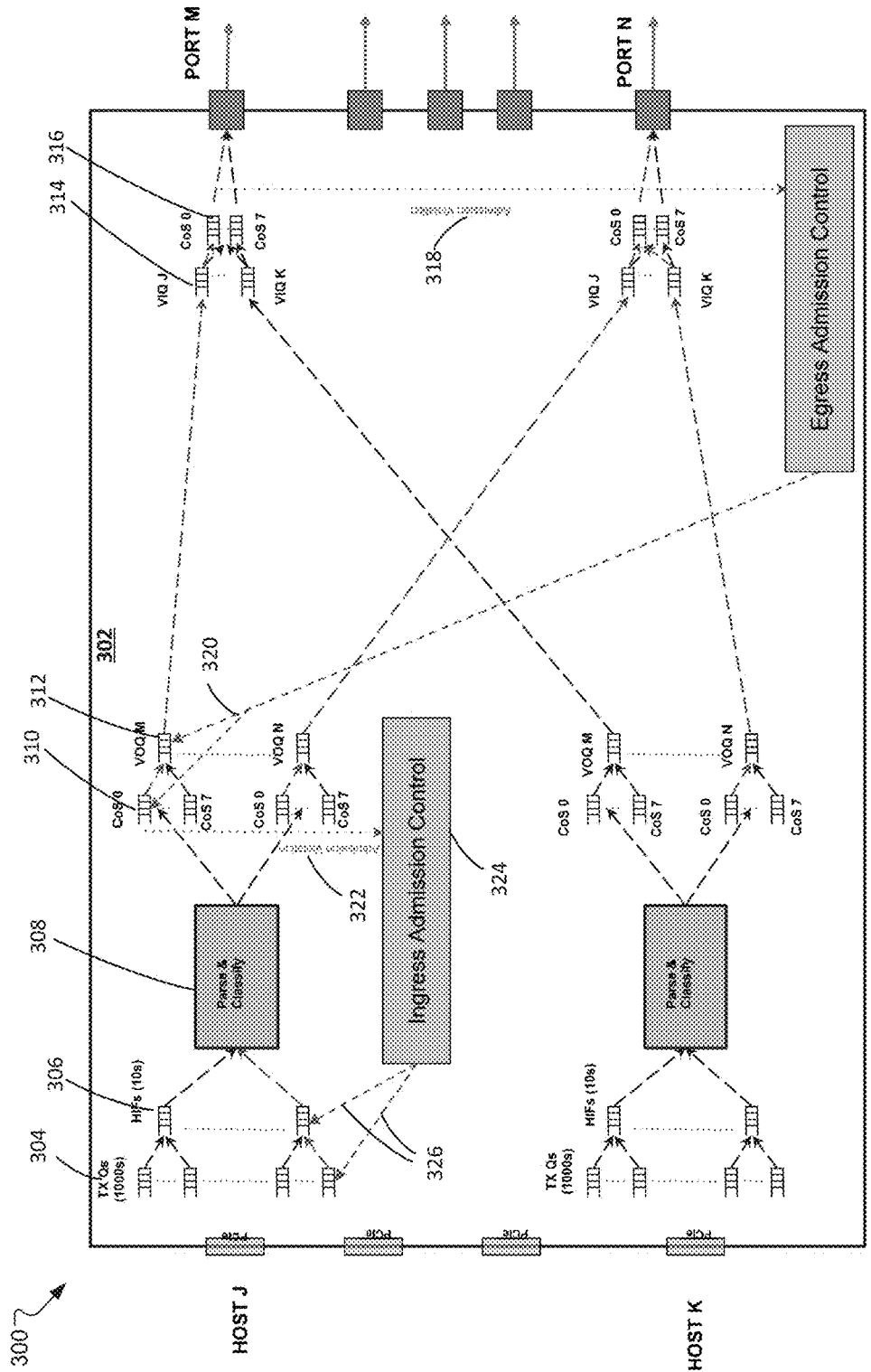
FIG. 3 illustrates an exemplary queue structure and packet flow used in admission and flow control, according to some embodiments.

FIG. 3 illustrates an exemplary queue structure and packet flow 300 used in admission and flow control by an integrated device 302. In the illustrated embodiment, the data flow starts from host J and/or host K, where software application(s) running on the host(s) requests the data transmission. The software applications may send out application data through a number of a hardware transmit data queues.

These queues, i.e., potentially thousands of TXQs 304, are configured to map to software application streams in the main memory of one or more hosts or sending nodes (e.g., host J and/or host K).

In virtualized/containerized systems, it is common to virtualize the network services by partitioning a physical NIC into multiple logical network interfaces. The NIC partitioning may enhance I/O performance in a virtualized environment, advancing hardware consolidation and flexible bandwidth provisioning for heightened agility. In some embodiments, to accomplish the NIC partitioning, integrated device 302 may aggregate at least a subset of the large number (e.g., thousands) of TXQs 304 into a small number (e.g., dozens) of sending node interfaces. The sending node interfaces, e.g., Host Interfaces (HIFs) 306 in FIG. 3, are used to deliver application data to an ingress pipeline or ingress level queuing. The HIF queue arbiters ensure fair access of TXQs 304 to the ingress pipeline.

In some embodiments, integrated device 302 may feed the headers of packets in all the HIFs 306 into a packet parser and classifier of the ingress pipeline for processing. The classification is hierarchical, e.g., in respective levels of host, HIF, and TxQ. Each level has its individual isolation constraints. In the host level, bandwidth cannot be shared or reallocated among hosts. For example, host J cannot obtain host K's bandwidth to transmit more data. In the HIF level, the HIFs can share a host' bandwidth, but the HIFs are isolated within that host. For example, the HIFs of host J can share host J's bandwidth, and the HIFs of host K can share host K's bandwidth. In the TxQ level, however, the TxQs within a host can share the bandwidth with other TxQs of other hosts, and the TxQs are handled based on the CoS processing.

As shown in 308 of FIG. 3, the packet parser and classifier may parse and classify the packet headers of the packets received at the sending node interfaces and identify one or more packet properties from the packet headers. The one or more properties may include at least an ingress CoS, an egress port, and an optional egress CoS associated with a packet. The ingress CoS is the CoS of the packet that is determined based on the needs of a software application installed on a sending node that generated and sent the packet. The egress port is the destination's egress port on the integrated switch. A destination is a receiving node (e.g., an output device) to which the packet is transmitted.

Based on the two properties including the ingress CoS and the egress port, the packets from HIFs 306 are moved to an ingress level queuing. In some embodiments, the ingress level queuing includes a separate Virtual Output Queue (VOQ) 312 for each egress port. For example, VOQ M is configured for port M, and VOQ N is configured for port N. Each port M or N is used to transmit the data packets to a receiving node. Rather than keeping all data traffic in a single queue, separate queues VOQs are maintained for each possible output location/device to at least address the head of line blocking problem.

In some embodiments, at the ingress level queuing, the packets from HIFs 306 are sorted based on their ingress CoS for each egress port (e.g., InCoSQ 310/VOQ 312), i.e., each packet is sorted based on an ingress CoS 310 associated with the packet and moved to a VOQ 312 corresponding to an egress port. At this point, the packets are ready to be forwarded to egress ports if an admission policy allows. The admission policy manages the access control in the network.

The packets in the ingress level queuing are then moved to an egress level queuing. In some embodiments, the egress level queuing includes a separate Virtual Input Queue (VIQ) for each ingress port. The egress ports may provide separate queues, VIQs 314, per ingress port at each egress port, to further prevent head of line blocking and to ensure ingress port fairness. As shown in FIG. 3, integrated device 302 may configure a VIQ J per ingress port of host J and a VIQ K per ingress port of host K, at each egress port including port M and port N.

The packets in the VIQs of egress level queuing, however, need to be sorted again into separate queues for their egress CoS (EgCoSQ 316/VIQ 314), before they are sent out on the network. In other words, in the egress level queuing, each packet is moved to a VIQ 314 corresponding to the ingress port and sorted based on an egress CoS 316. In FIG. 3, the VIQs 314 include VIQ J and VIQ K, and the egress CoS 316 is of eight levels.

In some embodiments, the ingress CoS and the egress CoS may be the same for a packet. The ingress CoS of a packet was determined when the host sent this packet. However, as part of classifying and making a forwarding decision, the priority or CoS may be changed. In that case, the CoS used on the egress port, i.e., the egress CoS, will be modified.

Back-Pressure Congestion Control

Based on the queuing structure of integrated device 300 in FIG. 3, a process of congestion handling when the congestion occurs at an egress port is described below. The congestion may occur as a result of one or more of the scenarios including receipt of a PFC notification from the remote end of a data link, many-to-one oversubscription traffic patterns, per-CoS admission control policy resource limitations (e.g., on port bandwidth, shared memory utilization, etc.).

In the presence of port congestion, a backpressure algorithm may be applied. Backpressure refers to the buildup of data at a switch when buffers are filed up and cannot receive additional data. No additional data packets are transferred until the bottleneck of data has been eliminated or the buffer has been emptied. In some embodiments, the backpressure algorithm is applied from the congested individual queue {EgCoSQ 316, VIQ 314} to the individual queue(s) that are forwarding traffic to the congested queue. The back-pressure notifications stall the offending ingress forwarding queues {InCoSQ 310, VOQ 312}, without affecting any other queues that did not contribute to the congestion at the egress port in question.

As shown in FIG. 3, integrated device 302 determines whether port congestion is present based on whether a VIQ (e.g., VIQ J, VIQ K) is being congested with data packets of an egress CoS (e.g., CoS 0-7). If there is congestion, for example, due to data packets of CoS 0 in VIQ J, integrated device 302 may apply a backpressure algorithm on the egress offending/congested flow data {EgCoSQ 0, VIQ J}. Based on the backpressure algorithm, integrated device 302 may identify, in 318, an offending ingress forwarding queue {InCoSQ 0, VOQ M} that forwarded the data traffic to the congested egress queue {EgCoSQ 0, VIQ J}. As a result, integrated device 302 may generate an admission violation signal 318 to the ingress level queuing. Responsive to receiving the admission violation 318, the ingress level queuing, in turn, routes a backpressure notification 320 to stall or stop forwarding subsequent packets of the offending ingress forwarding queue {InCoSQ 0, VOQ M} while remaining to forward other packets from other ingress queues to the egress level queuing. However, if no congestion is detected, integrated device 302 may continue to forward the packets in the ingress level queuing (e.g., {InCoSQ, VOQ}) to the egress level queuing (e.g., {EgCoSQ, VIQ}), and further to the egress ports (e.g., port M, port N) associated with various receiving or destination nodes.

As compared to FIG. 2, integrated device 302, using the queue structure shown in FIG. 3, may identify the individual queue(s) from one or more hosts that contribute to the congestion rather than merely identifying the offending hosts, thereby achieving deeper granular packet flow control.

In some embodiments, integrated device 302 may continue stalling packet forwarding in the ingress level queuing until a criterion is met, for example, the data filed in InCoSQ 310 and/or VOQ 312 exceeds a pre-defined threshold. In response to the criterion being met, integrated device 302 may generate a congestion notification to trigger the stalling of packet forwarding at a sending node level queuing, e.g., at the ingress port of hosts. In some embodiments, integrated device 302 may send the congestion notification to a sending node's NIC queues that have been mapped to a specific ingress CoS, and stop scheduling subsequent packet transfers of the specific ingress CoS from the sending node's NIC queues to the ingress level queuing.

Stalling the packet forwarding process at the switch ingress pipeline, e.g., {InCoSQ 310, VOQ 312}, will eventually create a buildup in the number of packets queued up for forwarding in ingress level queuing of {InCoSQ or VOQ}. This will trigger a further congestion notification from the queues {InCoSQ or VOQ} to a host's NIC queues, e.g., TXQs 304 and HIFs 306, at the ingress port of the host device (e.g., host J or host K). In FIG. 3, based on queue buildup at the InCoSQ 310/VOQ 312 structures, integrated device 302 generates an admission violation signal 322 to the ingress admission control function engine 324. Ingress admission control function engine 324, either centralized or distributed, in turn, routes a backpressure notification 326 to the host's NIC queues.

The backpressure notification 326 is only sent to the queues that have been mapped to a CoS that has been stalled. In some embodiments, ingress admission control function engine 324 may issue this back-pressure notification 326 to the entire HIF 306, thereby shutting down all the traffic from a given virtual entity (e.g., a logical NIC). In other embodiments, ingress admission control function engine 324 may send the back-pressure notification 326 only to some of the TXQs 304 that belong to the HIF 306, which allows for pacing only the offending application flows without impacting other applications that may run on the same virtual entity. In any event, once a TXQ 304 detects the congestion or back-pressure notification, the TXQ 324 may stop scheduling any further packet transfers, only for the offending flow, from the memory of the offending host (e.g., host J) to integrated device 302. In this way, the congestion at the egress port is alleviated, with both the amount of congestion time and the impact on other hosts, virtual machines/containers, and applications being reduced to as least as possible.

In total, as shown in FIG. 3, the offending flow data may be isolated from data traffic in at least one of the egress level queuing (e.g., {EgCoSQ 316, VIQ 314}), the ingress level queuing (e.g., {InCoSQ 310, VOQ 312}), and the sending node level queuing (e.g., TXQs 304 and HIFs 306) without affecting the transmission of the rest of the data traffic.

Flow Diagram of Packet Transfer

Figure 4:
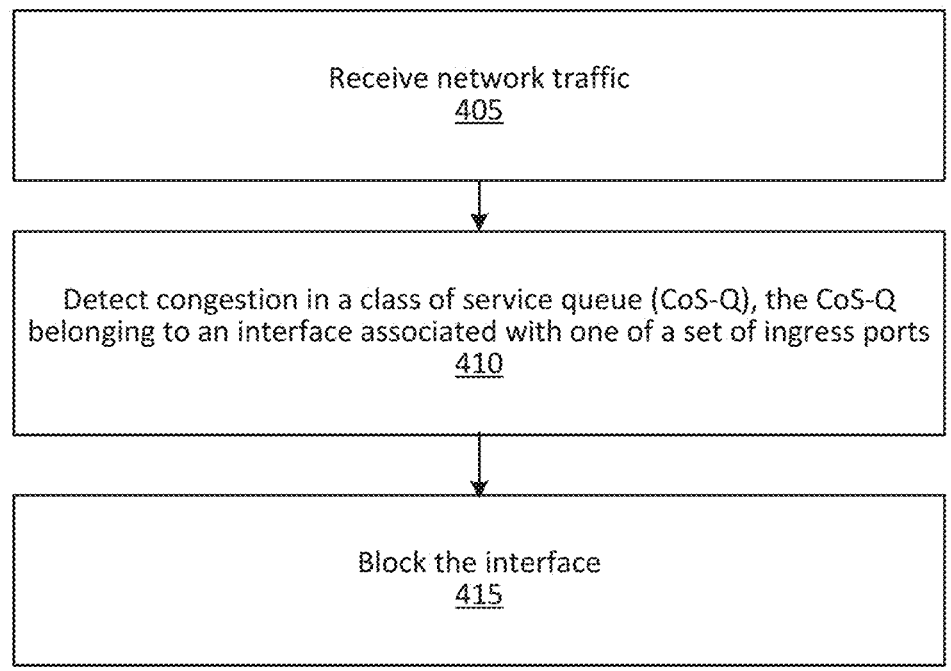
FIG. 4 illustrates an exemplary data flow diagram for performing granularity-level admission and flow control using the integrated device shown in FIG. 2, according to some embodiments.

FIG. 4 illustrates an exemplary data flow diagram 400 for performing granularity-level admission and flow control. In some embodiments, an integrated device 202 shown in FIG. 2 is used to implement method 400. Using method 400, when there is network congestion due to a particular class of data flow, integrated device 202 can identify one or more offending hosts (e.g., host J), and block the particular class of service from the offending host (e.g., host J) without affecting any data flow transmission (including the data flow of that particular class) from other hosts (e.g., host K).

Integrated device 202 of FIG. 2 integrates both NICs and a switch. For example, the NICs and the switch may be physically co-located on a single silicon die. In some embodiments, the switch is used for routing network traffic. The network traffic includes data packets that are classified into a set of classes of service (e.g., eight levels). The network traffic is from each of a set of ingress ports to one or more of a set of egress ports. Integrated device 202 also includes a set of interfaces, i.e., NICs. Each interface corresponds to a respective ingress port. Each interface includes one or more class of service queues (CoS-Qs) respectively corresponding to one or more of the set of classes of service.

As depicted in FIG. 4, at step 405, integrated device 202 receives network traffic through the set of interfaces. In response to the network traffic, the switch is configured to route the network traffic by detecting congestion and block the corresponding interface. At step 410, the switch detects congestion in a particular CoS-Q, corresponding to a particular class of service, the particular CoS-Q belonging to a particular interface associated with a particular ingress port. At step 415, the switch block the network traffic from that particular Cos-Q on that particular interface to a particular egress port, while (1) allowing routing, to that particular egress port, the network traffic from one or more CoS-Qs corresponding to one or more other classes of service on that particular interface, and (2) continuing forwarding, to one or more other egress ports, the network traffic from that particular Cos-Q on one or more other interfaces associated with other ingress ports.

Figure 5:
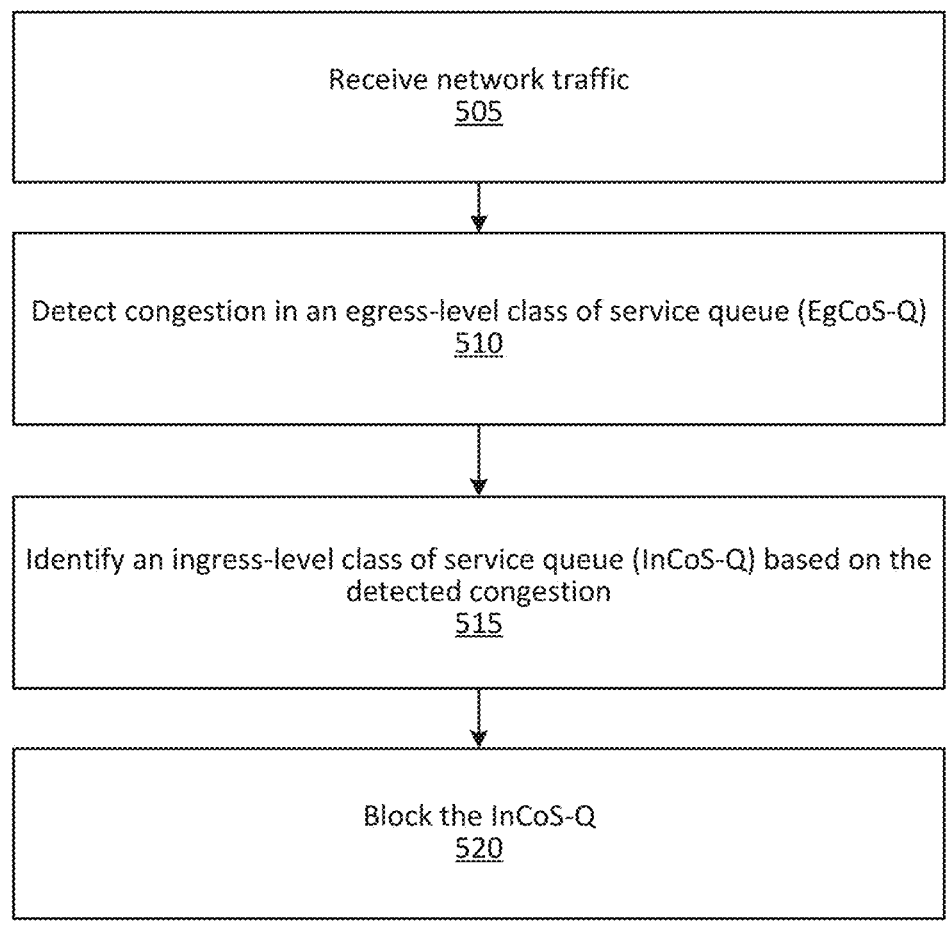
FIG. 5 illustrates an exemplary data flow diagram for performing granularity-level admission and flow control using the integrated device shown in FIG. 3, according to some embodiments.

FIG. 5 illustrates an exemplary data flow diagram 500 for performing granularity-level admission and flow control. In some embodiments, an integrated device 302 shown in FIG. 3 is used to implement method 500. Using method 500, integrated device 302 may allow finer granularity by identifying, from the offending host(s), one or more offending host interfaces (e.g., virtual NICs) and/or offending queues within the host interfaces. The offending host interfaces and/or offending queues are sources of the particular class of data flow that caused the congestion.

In some embodiments, integrated device 302 includes a switch is used for routing network traffic. The network traffic includes data packets that are classified into a set of classes of service (e.g., eight levels). The network traffic is from each of a set of ingress ports to one or more of a set of egress ports. Integrated device 302 includes a set of ingress-level class of service queues (InCoS-Qs). Each InCoS-Q corresponding to one of the classes of services. Integrated device 302 also includes one or more egress-level class of service queues (EgCoS-Qs). Each EgCoS-Q corresponds to one of the classes of service.

As depicted in FIG. 5, at step 505, integrated device 302 receives network traffic. In response to the network traffic, the switch is configured to route the network traffic. At step 510, the switch detects congestion in a particular EgCoS-Q, corresponding to a particular class of service, the particular EgCoS-Q being associated with a particular host. At step 515, the switch identifies an InCoS-Q corresponding to that particular class of service, and associated with that particular host.

In some embodiments, the integrated device receives the packets from sending nodes through a large number of hardware transmit data queues and aggregates at least subsets of the large number of hardware transmit data queues into a set of sending node interfaces (e.g., dozens of HIFs) that connect to the ingress level queuing. In some embodiments, the integrated device may parse and classify packet headers of the packets received at the sending node interfaces and identify one or more packet properties from the packet headers. The one or more properties include at least the ingress CoS, the egress port, and an optional egress CoS associated with each packet.

At step 520, the switch blocks that InCoS-Q, while allowing routing of the network traffic from one or more InCoS-Qs corresponding to that particular class of service, the one or more InCoS-Qs corresponding to one or more other hosts. In this way, only the offending ingress forwarding queue is stalled, and no other queues that did not contribute to the congestion at the egress port in question are affected. However, if congestion is absent, the switch may forward each packet to a corresponding egress port associated with the destination/receiving node.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for admission and flow control, comprising:
   a switch for routing network traffic, having a plurality of classes of service, from each of a plurality of ingress ports to one or more of a plurality of egress ports;
   a plurality of ingress-level class of service queues (InCoS-Qs), each InCoS-Q corresponding to one of the plurality classes of service; and
   one or more egress-level class of service queues (EgCoS-Qs), each EgCoS-Q corresponding to one of the plurality classes of service,
   wherein the switch is configured to:
      detect congestion in a particular EgCoS-Q, corresponding to a particular class of service, the particular EgCoS-Q being associated with a particular host;
      identify an InCoS-Q corresponding to that particular class of service, and associated with that particular host; and
      block that InCoS-Q, while allowing routing of the network traffic from one or more InCoS-Qs corresponding to that particular class of service, the one or more InCoS-Qs corresponding to one or more other hosts.

2. The system of claim 1, further comprising:
   a plurality of output queues, each output queue aggregating one or more InCoS-Qs corresponding to a respective host,
   wherein to block an InCoS-Q, the switch is configured to block an output queue within which the InCoS-Q is aggregated.

3. The system of claim 2, further comprising:
   a plurality of transmit queues;
   a plurality of interfaces, each interface aggregating a respective set of one or more transmit queues from the plurality of transmit queues; and
   a parser and classifier deriving the plurality of InCoS-Qs from the plurality of interfaces.

4. The system of claim 2, wherein, prior to detecting the congestion, the switch is further configured to:
   sort a plurality of packets of the network traffic based on an ingress class of service (CoS) associated with each packet of the plurality of packets;
   route the sorted packets to the plurality of output queues, each output queue of the plurality of output queues storing the packets to a particular destination;
   move the packets in each output queue to a separate input queue according to a respective host sending the packets; and
   re-sort the packets based on an egress CoS associated with each packet.

5. The system of claim 4, wherein the parser and classifier is further configured to:
   parse and classify packet headers of a plurality of packets of the network traffic; and
   identify one or more packet properties from the packet headers,
   wherein the one or more properties include at least the ingress CoS, an egress port, and an optional egress CoS associated with a packet,
   wherein deriving the plurality of InCoS-Qs from the plurality of interfaces is based on the one or more properties.

6. The system of claim 5, wherein the ingress CoS is a priority class determined for the packet based on a software application installed on a sending node that sent the packet.

7. The system of claim 1, wherein the switch is further configured to:
   determine that congestion is absent; and
   forward the network traffic to the plurality of egress ports associated with a plurality of receiving nodes.

8. The system of claim 1, wherein the switch is further configured to:
   continue to block the InCoS-Q while a criterion is met; and
   in response to the criterion being met, generate a congestion notification to trigger the stalling of packet forwarding at a host level.

9. The system of claim 8, wherein the switch is further configured to:
   send the congestion notification to Network Interface Controller (MC) queues of the particular host; and
   stop to schedule subsequent packet transfers of the particular class of service from the NIC queues of the particular host.

10. The system of claim 1, wherein the switch comprises a plurality of NICs integrated with a Top of Rack (TOR) switch.

11. A method for admission and flow control, comprising:
    configuring a plurality of ingress-level class of service queues (InCoS-Qs), each InCoS-Q corresponding to one of a plurality classes of service;
    configuring one or more egress-level class of service queues (EgCoS-Qs), each EgCoS-Q corresponding to one of the plurality classes of service; and
    routing, by a switch, network traffic from each of a plurality of ingress ports to one or more of a plurality of egress ports, wherein the network traffic has the plurality of classes of service, and
    wherein routing, by the switch, the network traffic comprises:
       detecting congestion in a particular EgCoS-Q, corresponding to a particular class of service, the particular EgCoS-Q being associated with a particular host;
       identifying an InCoS-Q corresponding to that, particular class of service, and associated with that particular host; and
       blocking that InCoS-Q, while allowing routing of the network traffic from one or more InCoS-Qs corresponding to that particular class of service, the one or more InCoS-Qs corresponding to one or more other hosts.

12. The method of claim 11, further comprising:
configuring a plurality of output queues, each output queue aggregating one or more InCoS-Qs corresponding to a respective host,
wherein blocking the InCoS-Q further comprises blocking an output queue within which the InCoS-Q is aggregated.

13. The method of claim 12, further comprising:
configuring a plurality of transmit queues;
configuring a plurality of interfaces, each interface aggregating a respective set of one or more transmit queues from the plurality of transmit queues; and
deriving, by a parser and classifier, the plurality of InCoS-Qs from the plurality of interfaces.

14. The method of claim 13, wherein, prior to detecting the congestion, the method further comprising:
sorting a plurality of packets of the network traffic based on an ingress class of service (CoS) associated with each packet of the plurality of packets;
routing the sorted packets to the plurality of output queues, each output queue of the plurality of output queues storing the packets to a particular destination;
moving the packets in each output queue to a separate input queue according to a respective host sending the packets; and
re-sorting the packets based on an egress CoS associated with each packet.

15. The method of claim 14, further comprising:
parsing and classifying packet headers of a plurality of packets of the network traffic; and
identifying one or more packet properties from the packet headers,
wherein the one or more properties include at least the ingress CoS, an egress port, and an optional egress CoS associated with a packet,
wherein deriving the plurality of InCoS-Qs from the plurality of interfaces is based on the one or more properties.

16. The method of claim 11, further comprising:
determining that congestion is absent; and
forwarding the network traffic to the plurality of egress ports associated with a plurality of receiving nodes.

17. The method of claim 11, further comprising:
continuing to block the InCoS-Q while a criterion is met; and
in response to the criterion being met, generating a congestion notification to trigger the stalling of packet forwarding at a host level.

18. The method of claim 17, further comprising:
sending the congestion notification to Network interface Controller (NIC) queues of the particular host; and,
stopping to schedule subsequent packet transfers of the particular class of service from the NIC queues of the particular host.

* * * * *